UNITED STATES PATENT OFFICE.

FERDINAND BLUM, OF FRANKFORT-ON-THE-MAIN, GERMANY, ASSIGNOR TO PHARMACEUTISCHES INSTITUT LUDWIG WILHELM GANS, OF SAME PLACE.

THYROID EXTRACT.

SPECIFICATION forming part of Letters Patent No. 636,891, dated November 14, 1899.

Application filed March 23, 1898. Serial No. 674,900. (Specimens.)

*To all whom it may concern:*

Be it known that I, FERDINAND BLUM, doctor of medicine, residing at Frankfort-on-the-Main, have invented new and useful Improvements in the Manufacture of Iodine Albumine Compounds, of which the following is a specification.

In the course of my investigations of the chemical and physiological action of the iodine substances of the thyroid gland and of albumin iodide I have come to the conclusion that the iodine substance of the thyroid gland is an albumin iodide preparation produced by the action of iodine upon the specific albumin body of the thyreoidea. According to my theory thyroiodin is therefore not a substance preëxisting in the thyroid gland, but is produced by the breaking up of the albumen iodide body of the thyroid gland. By this reaction an iodine containing part of the very complicated albumen molecule is separated, the quantity of iodine in which is, however, not constant.

Starting from the above-described view concerning the nature and essence of the iodine substance of the thyroid gland, I tried to discover if the iodine albumen of the thyreoidea could be precipitated by the same reagents as the genuine albumen. In carrying out these experiments I have found that an extract produced by the action of physiological solution of common salt upon thyroid glands showing a slightly alkaline reaction and being not too dilute coagulates if heated to from 90° to 100°. This coagulum contains a considerable quantity of iodine, which is not to be attributed to the thyroiodine contained therein, but to the lixiviated albumin. This, however, appears from the percentage of iodine contained by the coagulum. It amounts to, say, as much as 3.1 per cent. of iodine without including inorganic iodine or iodine substances capable of being extracted with alcohol. If this iodine percentage be compared with that of the thyroiodin and it be realized that thyroiodin has hitherto shown no constant composition and, on the other hand, with a high percentage of iodine (about ten per cent.) must always still possess a minimum molecular weight of over twelve hundred. If it be considered, further, that if synthetically-prepared albumen iodide bodies be broken up by the action of acids or lyes, substances result having quite analogous properties, as the so-called "thyreoidea," one would have to admit that the preëxisting iodine substance of the thyroid gland is not a thyreoidea albumen, but an albumen iodide. This albumin iodide may be transformed into an uncoagulable state in several ways. An aqueous solution of albumin iodide of the thyroid gland loses by addition of small quantities of formic aldehyde the property of coagulating by heat, so that by this method a thyroid-gland albumin iodide is obtained which is soluble in water, sterilized by the formic aldehyde, and non-coagulable. The driving off of the superfluous formic aldehyde is unnecessary.

The following is one mode of producing the product constituting my invention. Well-purified triturated thyroid glands are brought into a one-fourth to one-half per cent. formic-aldehyde solution and left standing. After a few hours considerable quantities of iodine containing albumine bodies have passed into the liquid. The maximum is reached after a few days. At this period the strongly-soaked insoluble thyroid-gland residue contains only a small quantity of iodine. The formic-aldehyde solution has, however, largely taken up the iodine-containing substance, which is uncoagulable by heat.

If the solution of the iodine body be too dilute for practical application, it may be concentrated in a vacuum without harm.

The above-described preparation made uncoagulable is more closely analogous to the previously-produced iodine substance of the thyroid gland than thyroidin and is intended for use for medical purposes in cases where thyroid medicines are applied now. It differs from iodine albumine bodies, which are produced synthetically, by its action on the human body in increasing the metabolism of the albumine compounds.

The chief characteristics of my new iodine albumine bodies are the following: They are uncoagulable by heat, show the general albumen reactions, do not yield iodine to hot alkaline solution, are precipitated in floccula by mineral acids, and if heated with mineral acids formaldehyde splits off and distils out of the solution. The albumen bodies also increase the metabolism of the albumen compounds in the human body.

What I claim, and desire to secure by Letters Patent, is—

As a new article of manufacture, iodine albumen bodies of the character described, produced by the action of formic-aldehyde solution upon the thyroid gland, the same being when in aqueous solution uncoagulable by heat, showing the general albumen reactions, not yielding iodine to hot alkaline solutions and being precipitated by mineral acids in floccula.

In testimony whereof I have signed my name to this specification in the presence of two subscribing witnesses.

FERDINAND BLUM.

Witnesses:
DEAN MASON,
JEAN GRUND.